A. G. COOPER.
ENGINE LUBRICATOR.
APPLICATION FILED MAR. 27, 1914.
1,158,121. Patented Oct. 26, 1915.
3 SHEETS—SHEET 2.
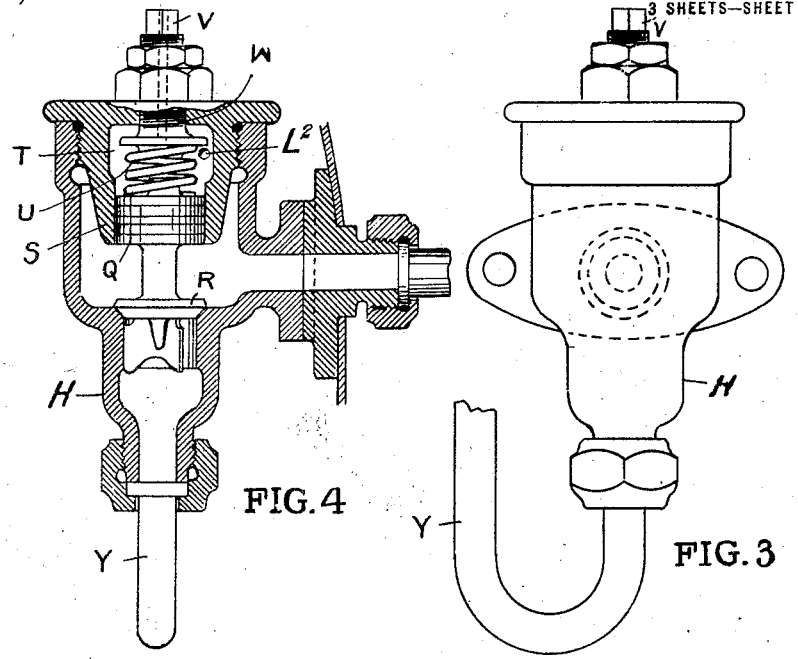
FIG. 4
FIG. 3
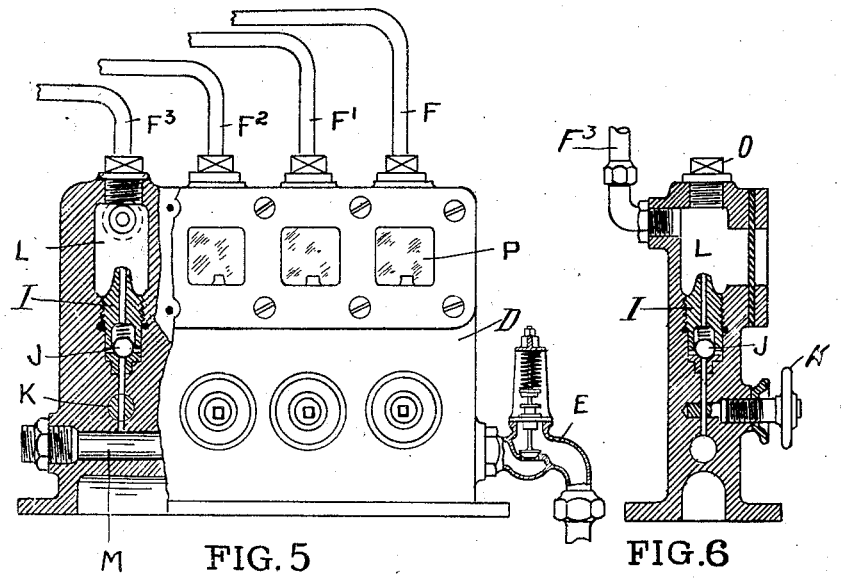
FIG. 5
FIG. 6
WITNESSES:
John G. Sanders
Albert F. Heuman
INVENTOR:
Arthur George Cooper
BY
Wm Wallace White
ATTY

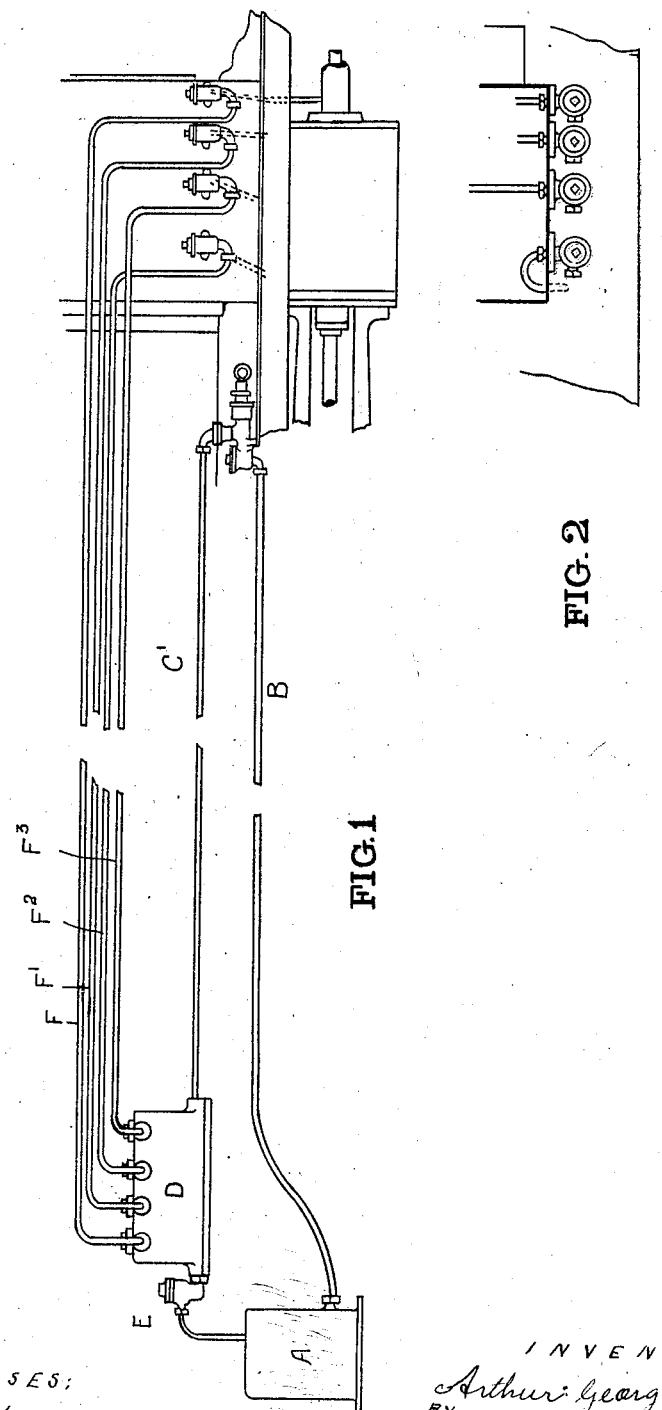

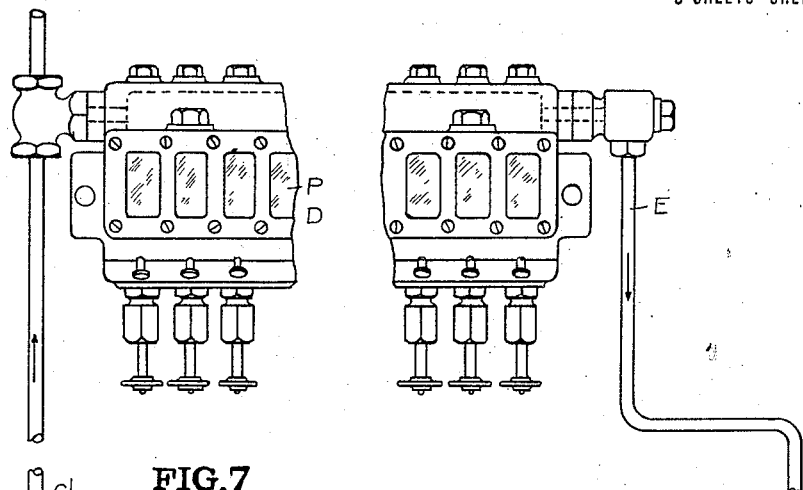
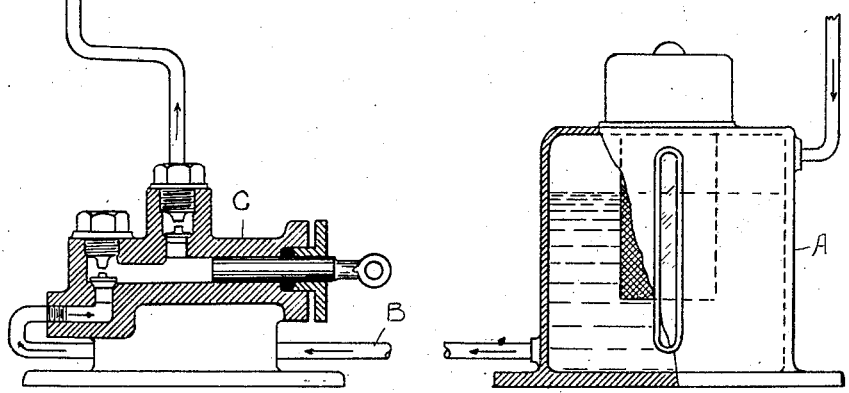
FIG.7
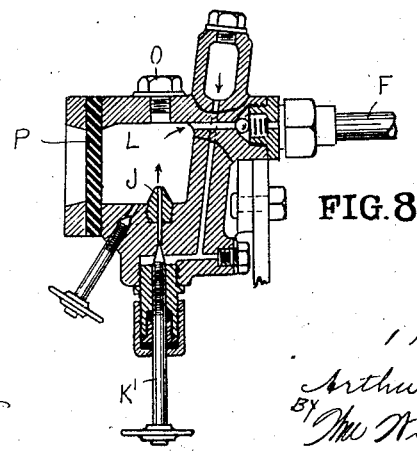
FIG.8

UNITED STATES PATENT OFFICE.

ARTHUR GEORGE COOPER, OF SYDNEY, NEW SOUTH WALES, AUSTRALIA.

ENGINE-LUBRICATOR.

1,158,121. Specification of Letters Patent. Patented Oct. 26, 1915.

Application filed March 27, 1914. Serial No. 827,575.

*To all whom it may concern:*

Be it known that I, ARTHUR GEORGE COOPER, a subject of the King of Great Britain and Ireland, residing at 7 O'Connell street, Sydney, New South Wales, Australia, have invented certain new and useful Improvements in Engine-Lubricators, of which the following is a specification.

This invention relates to lubricators having their chief utility in connection with locomotives, but usable also in connection with steam, oil and gas engines of other classes.

The object of my invention is to provide a means whereby continued and regular lubrication is insured through oil service pipes independent of the steam or fuel supply pipes, particularly in the cylinders of the engine, and in any other parts thereof in which internal pressure exists.

In present systems of lubrication in which oil is forced under constant head through an oil feed pipe line of considerable length or volume, the feed of oil to the cylinder or other engine part containing internal pressure becomes excessive as the pressure therein drops, so that when the engine is running light an overplus of oil is supplied whereas when the engine is working under a full head of pressure the lubrication frequently becomes deficient. Moreover, when an engine is running light for a considerable time, as in the case of a locomotive running on a long downward grade, the oil service pipe becomes partially discharged of oil, and the oil feed then becomes ineffective until the oil service pipe has been more or less fully recharged. When that pipe is long and the volume contained in it is considerable, a sufficient time is often required for this refilling to permit of the frictional surface on which lubrication is required becoming injured owing to non supply of lubricant thereto, and for this reason resort is not infrequently had to refilling the pipe by means of a hand pump, involving the inconvenience of uncoupling the pipe joints to obtain access to it, unless a bypass is fitted to facilitate this refilling operation.

According to my said invention a balanced check valve is interposed in each lubricator service pipe line close up to the cylinder or other part in which internal pressure exists. The oil pipe service line to this check valve is controlled and fed usually through a sight feed lubricator under positive pump pressure, a little in excess of the highest pressure found under working conditions in the engine cylinder or other engine part. The pressure in the cylinder acts both upwardly and downwardly on the balanced valve, but said valve is kept down to its seat by spring pressure, the spring being controlled by a cap and set screw by turning which latter the pressure may be varied and regulated as required. The spring pressure reacts against the opposed pressure of the oil in the service pipes, which is kept at or slightly above the maximum steam pressure in the cylinder or other engine part. The oil pressure opens the valve against the spring, and oil is forced past the valve. Immediately thereafter the oil pressure being relieved by the escape of oil through the valve, the valve is restored to its seat by the spring and further flow of oil is checked. Whether running light or on full load therefore the oil feed is maintained and the service pipes retained full of oil under effective supply pressure, the measure of the feed being determined by the overplus of supply pressure in excess of the spring loading on the balanced valve.

The object of my invention is accomplished by fitting in each of the oil service pipes in proximity to the point of delivery of the oil a variable spring loaded valve, the loading of which is proportioned to the pressure of the oil feed so that said valve will operate to assure a feed of lubricant to the engine whether running heavy or light. Oil is fed to these valves under positive pump pressure a little in excess of the highest pressure found under working conditions in the engine cylinder or other engine part, and in order to permit of efficient supervision, particularly when, as is almost invariably the case, several oil leads are necessary, a sight feed manifold is associated with the oil pumping means so that the delivery of lubricant to the several oil service pipes may be kept under observation. The construction of the oil check valve is such that the steam pressure is balanced against its two sides. The valve is kept on its seat by spring pressure, means being provided for varying this pressure so that the spring will at all times maintain a pressure tending to keep the valve closed against the head of oil being fed to it. The head pressure of the oil is greater than the maximum steam pressure and the valve loading is intermediate of these two pressures. The oil pressure is therefore operative to open the valve against the spring to admit oil to the cylinder or other engine part. The operation of the valve is therefore independent of the steam pressure and the valve consequently operates to deliver lubricant whether the engine is running light or on heavy load and the oil service pipes rearward of the check valves are always retained full of oil under full head of pressure, the measure of oil feed being determined by the overplus of head pressure applied to the oil in excess of the spring loading on the check valve.

In the accompanying drawings, Figure 1 is a semi-diagrammatic view of a lubricating system according to my invention applied to a locomotive cylinder; Fig. 2 is a fragmentary plan view showing the check valves in connection therewith; Fig. 3 is an external view of one of the check valves; and Fig. 4 is a vertical section therethrough; Fig. 5 is a sectional elevation of the sight feed manifold; and Fig. 6 is a transverse section through same; Fig. 7 is a sectional elevation of the reservoir, pump and manifold, and Fig. 8 is a transverse section through the manifold.

In the form of the invention illustrated in Figs. 1 to 6 of the drawings, inclusive, A is an oil reservoir, B is a suction pipe therefrom to oil pump C driven by any suitable connection to motive power or operated direct by steam pressure, C' is an oil supply pipe, D is a sight feed lubricator manifold, and E is an oil overflow return from manifold D to oil reservoir A. F, F', F², F³ are lubricating service pipes to engine cylinders or other parts under internal pressure to which lubricant is to be served. G is an engine cylinder. H, H', H² and H³ are regulator balance non return valves fitted close to delivery ends of service pipes F, F' F² and F³ respectively, having their supply connections led into valve chests, cylinder clearance, stuffing box or other engine parts as aforesaid.

In the lubricator manifold D which is shown in detail in Figs. 5 and 6, the lubricator service pipes are connected each to the upper end of separate chamber therein; in the lower part of each of these chambers a nipple I is fitted. Below this nipple in each case is a stop cock K for controlling the supply of lubricant therethrough. The several passages leading through the stop valves K and the nipples I and thence to the chambers L, lead into a trunk pipe M into which oil is forced through the pipe line C'. In the arrangement shown in Figs. 5 and 6, this pipe is located below the nipples, so that the oil is fed directly upward. A variable relief valve E permits overplus of oil to return to the oil reservoir A. In front of each of the chambers L is an aperture glazed as shown at P through which passage of oil upward in drops may be observed as in an ordinary sight feed lubricator. Plugs O are fitted in the upper ends of the chambers L to facilitate access to the valves J or for cleaning purposes.

The balance spring loaded service valves H, H', H² and H³ are shown in detail construction in Figs. 3 and 4. In these valves the chamber intermediately between the valve heads Q and R is connected to the cylinder, tail rod case, or other parts as aforesaid. The pressure of steam or gas acts equally on the valve heads Q and R. The upper head is fitted with rings S to prevent the flow of steam past it, and the clearance space T at the back is provided with a leak hole L² through which any accidental steam may pass out and so leave the valve free to operate. U is the loading spring, the pressure of which can be varied by turning the cap V which works in a screwed socket W. Y is the oil delivery connection from the sight feed manifold corresponding to the pipe F, F', F² and F³.

The pressure of the spring U is adjusted by turning the cap V until the valve R bears on its face with just sufficient pressure to keep it effectively closed at the maximum working pressure in the engine part. When the pressure in the connecting pipe Y is sufficient to lift the valve against the spring U the overplus of oil is forced into the cylinder or other part to be lubricated, but immediately the pressure of oil in the connection Y is relieved the valve closes automatically and lubricant ceases to flow. It is thus insured that the engine parts will be lubricated under constant oil pressure irrespective of the internal working pressures of the cylinder or other parts and that therefore the pipes are not robbed and the engine part is not overfed, underfed or fed with lubricant indiscriminately. Effective lubrication is thus insured and waste of oil avoided.

The modification of the structure and the preferable arrangement of the device is shown in Figs. 7 and 8 of the drawings, the same involving the same principle of operation as heretofore described. As compared with the arrangement shown in Figs. 5 and 6 of the drawings, in which the oil is fed to the trunk pipe M located at the bottom of the manifold, in the arrangement shown in Figs. 7 and 8 of the drawings the oil feed connection is carried into the passage or trunk pipe M' located in the top of the manifold B' with oil leads Y' extending from each of a series of compartments L' while a needle valve K' is provided for controlling the flow of oil from the passage M' through a series of ducts into N' and the discharge nozzles or nipples, O'. The outlets are indicated by reference character P' having valves Q' in the form of spring seated ball valves serving to permit the outlet of oil under pressure as heretofore described. In this form of the invention the reservoir A is the same as shown in Fig. 1, as well as the pump C, except that the oil overflow return is through the duct E', leading from one end of the passage or trunk pipe M' to the top of the manifold having communication with the respective chambers as above described.

I do not limit myself to the precise detail of construction shown in these drawings, so long as the essential principle be maintained of the interposition of a balanced check valve with spring loading in each of the lubricating leads close up to the point of lubrication. The spring loading of the valve must be adjusted at a point equal to or greater than the working pressure in the parts served with oil through the valve, and the oil feed pressure must exceed the valve loading pressure, the rate of flow of oil through the valve being controlled by the relative pressures on the spring end and the oil feed end of the valve.

What I claim as my invention and desire to secure by Letters Patent is:—

1. In an engine lubricating system, a lubricator service pipe, a variable spring controlled balanced valve interposed in the lubricator service pipe close to the point of application of lubrication, said valve opening automatically against said spring by overplus of oil pressure in the service pipe against operating pressure and passing a quantity of oil determined by such pressure overplus independent of the operating pressure.

2. An engine lubricating system comprising an oil reservoir, an oil pump, a manifold having connection with the reservoir and pump, service pipes between the manifold and parts to be lubricated, and a variable spring loaded balanced valve located near the distant end of each oil service pipe and manifold, said valve being held closed against the maximum working pressure of the engine part, but adapted to be opened by the said pressure of the oil to admit oil to the engine parts.

3. An engine lubricating system comprising an oil reservoir, an oil pump, a sight feed manifold, a cut-off therefor, a connection between the reservoir and manifold, a relief valve in said connection to discharge overplus of oil to said reservoir, service pipes leading from said manifold and a variable spring loaded balanced valve held under the pressure of the engine and located near the distant end of each service pipe, said valve being normally closed but opened by superplus of oil pressure above the loading spring pressure, whereby said spring will be compressed to permit the discharge of oil from the respective service pipes into the parts to be lubricated.

4. An engine lubricating system comprising an oil reservoir, an oil pump, a sight feed manifold having an overflow pipe leading to the reservoir, a cut-off therefor, a variable relief valve in said overflow pipe to said reservoir, service pipes leading from said manifold and a variable spring loaded balanced valve held under the pressure of the engine and located near the distant end of each service pipe, said valve being normally closed but opened by superplus of oil pressure above the loading spring pressure, said loading being adjusted in excess of the working pressure in the parts served through said valve.

5. An engine lubricating system, comprising oil supply means, means for forcing said oil under pressure, a part to be lubricated, said latter part being under high steam pressure, connections between the supply means and the part to be lubricated through which the oil is forced for discharging the same into said parts to be lubricated, and means associated with said connections adjacent to the parts to be lubricated and normally retained against the pressure of the oil in a position to prevent the supply of oil thereto, said last mentioned means being at a pressure intermediate the steam pressure and oil pressure adapted to be opened by excessive oil pressure to supply oil into the part to be lubricated.

6. An engine lubricating system, comprising oil supply means, means for forcing said oil under pressure, a part to be lubricated, said latter part being under high steam pressure, connections between the supply means and the part to be lubricated through which the oil is forced for discharging the same into said parts to be lubricated, and means associated with said connections adjacent to the parts to be lubricated and retained by the pressure of the latter in a position to prevent the supply of oil thereto, said means including a variable spring loaded balance valve including a casing, a valve movable in said casing and having a head adapted to seat against the oil pressure, a piston on the valve between which and said head, said steam operates to normally hold the valve in an inoperative position to prevent the passage of oil, means normally holding the head in a seated position and means for adjusting the pressure of said spring, said head being adapted to be unseated by excessive pressure in the oil supply above the steam or working pressure of the parts to be lubricated.

In testimony whereof I have affixed my signature in presence of two witnesses.

ARTHUR GEORGE COOPER.

Witnesses:
W. I. DAVIS,
HAROLD A. RORKE.